United States Patent
Huang et al.

(10) Patent No.: US 9,684,368 B2
(45) Date of Patent: Jun. 20, 2017

(54) EVENT DETECTION METHOD FOR WAKING UP A PORTABLE ELECTRONIC DEVICE AND ACTION SENSOR USING SAME

(71) Applicant: RICHTEK TECHNOLOGY CORPORATION, Chupei, HsinChu (TW)

(72) Inventors: Hung-Chi Huang, New Taipei (TW); Ying-Che Lo, Tainan (TW); Chih-Hsien Wang, Taoyuan (TW); Chih-Yi Hsiao, Taoyuan (TW); Lupu Liao, Taipei (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 0 days.

(21) Appl. No.: 14/885,257

(22) Filed: Oct. 16, 2015

(65) Prior Publication Data

US 2017/0108916 A1    Apr. 20, 2017

(51) Int. Cl.
*G06F 1/32* (2006.01)
*H04W 52/02* (2009.01)

(52) U.S. Cl.
CPC ............ *G06F 1/3296* (2013.01); *G06F 1/325* (2013.01); *G06F 1/3206* (2013.01); *H04W 52/0254* (2013.01)

(58) Field of Classification Search
CPC ...................................................... G06F 1/325
See application file for complete search history.

(56) References Cited

U.S. PATENT DOCUMENTS

| 9,176,636 | B1 * | 11/2015 | Maharyta | G06F 3/044 |
| 2011/0199336 | A1 * | 8/2011 | Kao | G06F 1/3262 345/175 |
| 2013/0124891 | A1 * | 5/2013 | Donaldson | G06F 1/163 713/322 |

* cited by examiner

Primary Examiner — Albert Wang
(74) Attorney, Agent, or Firm — Tung & Associates

(57) ABSTRACT

The present invention discloses an event detection method for waking up a portable electronic device and an action sensor using same. The event detection method includes the steps of: under a normal operation mode, sensing action events by the action sensor with a first data sensing frequency, wherein the action sensor operates by a normal current to detect the action events; entering into a sleep mode; under the sleep mode, detecting a wake-up event by the action sensor with a second data sensing frequency, wherein the action sensor operates by a weak current to detect the wake-up event, wherein the weak current is smaller than the normal current, and the second data sensing frequency is not higher than the first data sensing frequency; and returning to the normal operation mode when the wake-up event is detected.

13 Claims, 3 Drawing Sheets

EVENT DETECTION METHOD FOR WAKING UP A PORTABLE ELECTRONIC DEVICE AND ACTION SENSOR USING SAME

BACKGROUND OF THE INVENTION

Field of Invention

The present invention relates to an event detection method for waking up a portable electronic device and an action sensor using same; particularly, it relates to such event detection method and action sensor capable of accurately detecting a wake-up event when the portable electronic device is in a sleep mode.

Description of Related Art

Please refer to FIG. 1A and FIG. 1B, which show how the prior art switches a portable electronic device from a sleep mode to a normal operation mode and its drawback. When a portable electronic device is power ON but has not been in use for a certain period of time, typically, its power management system will shut down the operations of at least some of its components to reduce power consumption, which is the "sleep mode". In the "normal operation mode" the portable electronic device operates normally, i.e., all the components of the portable electronic device are in operation or ready for operation. In the "sleep mode", one or more of the components of the portable electronic device are not fully functioning such that the power consumption is reduced.

Conventionally, in a portable electronic device having an action sensor such as a capacitive touch sensor, an acceleration sensor, a gyro-sensor or the like, the action sensor is shut down in the sleep mode to reduce power consumption. Referring to FIG. 1A, in the normal operation mode, the action sensor senses action events with a data sensing frequency CLK1 (e.g., 100 Hz). During this normal operation mode, the action sensor is supplied with a current In (referring to as "normal current" hereinafter) which is sufficient for the action sensor to fully function, so as to sense action events with the best accuracy and resolution. When the portable electronic device enters into the sleep mode, the action sensor is shut down. However, a user may cause a certain wake-up event to happen, such as tapping a screen of the portable electronic device, in order to wake up the portable electronic device to resume it from the sleep mode to the normal operation mode. Therefore, although the action sensor is shut down, it should not be completely disabled, and typically in the prior art, the action sensor still senses action events but with a greatly reduced data sensing frequency. For example, referring to FIG. 1A, in the sleep mode, the action sensor detects whether there is a wake-up event with a much lower data sensing frequency CLK0 (typically about 1/100 of the data sensing frequency CLK1, e.g., 1 Hz). When a wake-up event is detected under this much lower data sensing frequency CLK0, the portable electronic device is resumed from the sleep mode to the normal operation mode.

Referring to FIG. 1B, the drawback of the prior art is that there is high possibility that the action sensor can not capture a wake-up event during the sleep mode. Typically, a user's tapping action is in a frequency range of about 10 Hz. With the low data sensing frequency CLK0, it is very likely that the action sensor will miss the tapping action, and as a result, the portable electronic device will not resume from the sleep mode to the normal operation mode.

In view of the above, to overcome the drawbacks in the prior art, the present invention proposes an event detection method for waking up a portable electronic device and an action sensor using the same, wherein such event detection method and action sensor are capable of accurately detecting a wake-up event when the portable electronic device is in a sleep mode.

SUMMARY OF THE INVENTION

From one perspective, the present invention provides an event detection method for waking up a portable electronic device having an action sensor, comprising the steps of: under a normal operation mode, sensing action events by the action sensor with a first data sensing frequency, wherein the action sensor operates by a normal current to detect the action events; entering into a sleep mode wherein at least one component of the portable electronic device is not fully functioning to reduce power consumption; under the sleep mode, detecting a wake-up event by the action sensor with a second data sensing frequency, wherein the action sensor operates by a weak current to detect the wake-up event, wherein the weak current is smaller than the normal current, and the second data sensing frequency is not higher than the first data sensing frequency; and returning to the normal operation mode when the wake-up event is detected.

From another perspective, the present invention provides an action sensor for use in a portable electronic device, comprising: a clock circuit for providing a first data sensing frequency under a normal operation mode and a second data sensing frequency under a sleep mode, wherein the second data sensing frequency is not higher than the first data sensing frequency, and wherein in the sleep mode, at least one component of the portable electronic device is not fully functioning to reduce power consumption; a current generation circuit for supplying a normal current under the normal operation mode and supplying a weak current under the sleep mode, wherein the weak current is smaller than the normal current; and an event detection circuit coupled to the clock circuit and the current generation circuit, for sensing action events with the first data sensing frequency under the normal operation mode or detecting a wake-up event with the second data sensing frequency under the sleep mode, wherein the event detection circuit operates by the normal current to detect the action events under the normal operation mode, and wherein the event detection circuit operates by the weak current to detect the wake-up event under the sleep mode; wherein the action sensor generates an output signal for resuming the portable electronic device to the normal operation mode when the wake-up event is detected by the event detection circuit.

In one embodiment, the action sensor further comprises: a sleep mode controller coupled to the clock circuit and the current generation circuit, for providing a mode switching signal to the clock circuit and to the current generation circuit, to switch a data sensing frequency of the clock circuit between the first and second data sensing frequencies and to switch a current provided by the current generation circuit between the normal current and the weak current.

In one embodiment, the weak current is greater than zero and smaller than or equal to 50% of the normal current.

In the above-mentioned embodiment, the weak current is preferably 20%~40% of the normal current.

In one embodiment, the step of entering into a sleep mode is triggered manually or automatically.

In one embodiment, the action sensor is a capacitive sensor sensing the action events and detecting the wake-up event according to a change of capacitance.

In one embodiment, a sensitivity of the capacitive sensor is related to an operation current of the capacitive sensor, and when the capacitive sensor operates by the weak current, the sensitivity of the capacitive sensor is lower than the sensitivity when the capacitive sensor operates by the normal current.

In one embodiment, the first data sensing frequency ranges between 80~120 Hz and the second data sensing frequency ranges between 20~60 Hz.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the components and devices, but not drawn according to actual scale.

Figure 2:
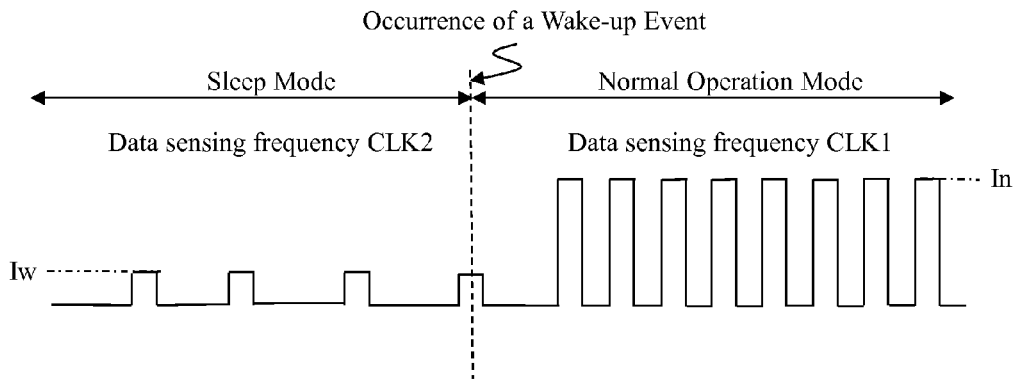
FIG. 2 shows how the present invention switches a portable electronic device from a sleep mode to a normal operation mode.
Figure 3:
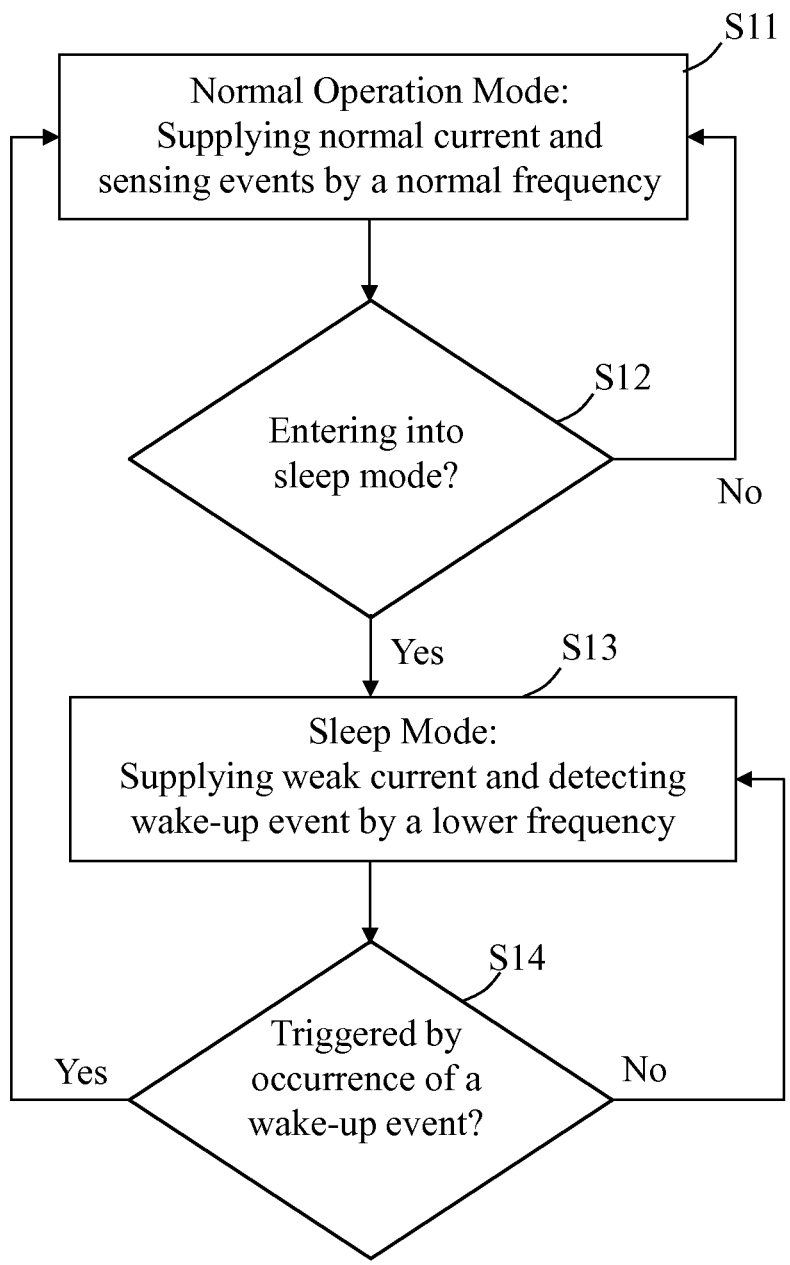
FIG. 3 shows a flow chart of an event detection method according to an embodiment of the present invention.
Figure 4:
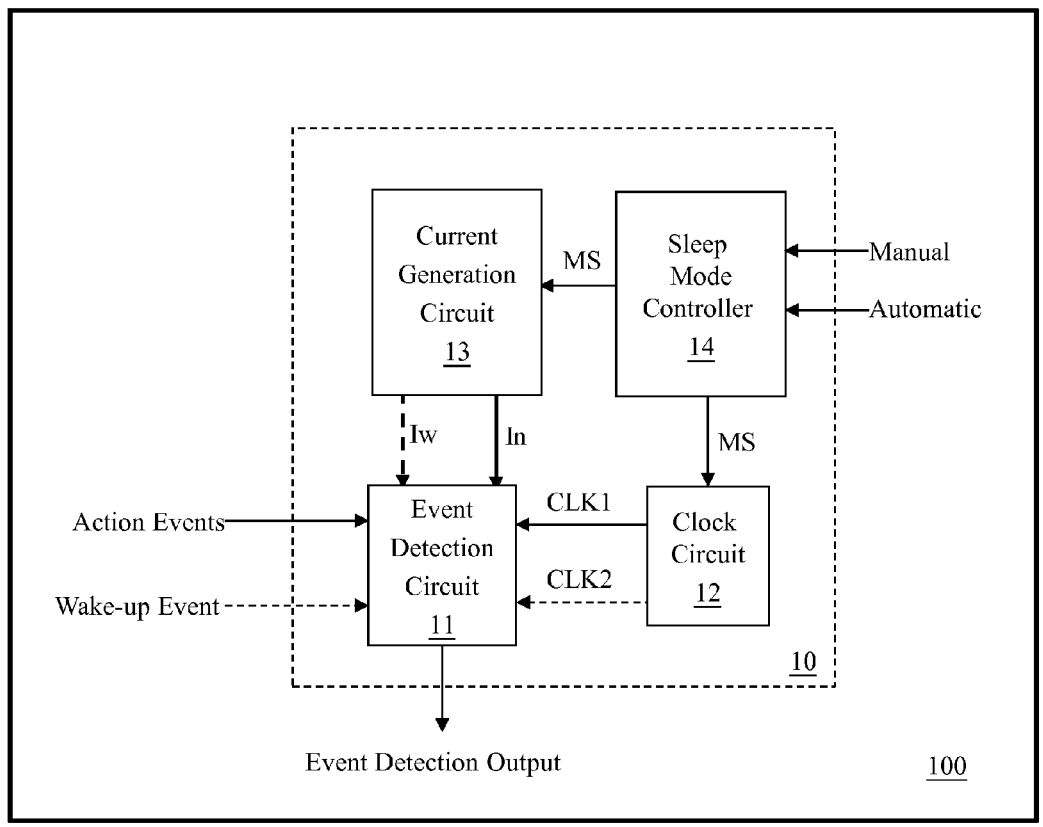
FIG. 4 shows a block diagram of an action sensor according to an embodiment of the present invention.

Please refer to FIGS. 2-4. FIG. 2 shows how the present invention switches a portable electronic device from a sleep mode to a normal operation mode. FIG. 3 shows a flow chart of an event detection method according to an embodiment of the present invention. FIG. 4 shows a block diagram of an action sensor according to an embodiment of the present invention.

As shown in FIG. 4, a portable electronic device 100 includes an action sensor 10. The portable electronic device 100 includes other components such as a screen, a graphic controller, etc., which are omitted because they are not relevant to the present invention. The action sensor 10 senses action events in the normal operation mode and detects a wake-up event in the sleep mode. In one embodiment, the action sensor 10 is a capacitive sensor sensing the action events and detecting the wake-up event according to a change of capacitance. The action sensor 10 is for example a capacitive touch sensor, an acceleration sensor, or a gyro-sensor.

The action sensor 10 of this embodiment comprises an event detection circuit 11, a clock circuit 12 and a current generation circuit 13. In one embodiment, the action sensor 10 further comprises a sleep mode controller 14, coupled to the clock circuit 12 and the current generation circuit 13.

Please refer to FIG. 4 in conjugation with FIG. 2. In one embodiment, the event detection circuit 11 is coupled to the clock circuit 12 and the current generation circuit 13. The clock circuit 12 provides a data sensing frequency CLK1 in the normal operation mode and a data sensing frequency CLK2 in the sleep mode, wherein the data sensing frequency CLK2 is not higher than the data sensing frequency CLK1 and preferably lower than the data sensing frequency CLK1. The current generation circuit 13 supplies a normal current In in the normal operation mode and a weak current Iw in the sleep mode, wherein the weak current Iw is lower than the normal current In. In one embodiment, whether the clock circuit 12 provides the data sensing frequency CLK1 or the data sensing frequency CLK2, and whether the current generation circuit 13 supplies the normal current In or the weak current Iw are controlled by a mode switching signal MS generated by the sleep mode controller 14. In another embodiment, the sleep mode controller 14 can be omitted and the frequency and current switching can be controlled by a circuit in the portable electronic device 100, such as a micro-controller unit already existing in the portable electronic device 100.

In one embodiment, the sleep mode controller 14 can be triggered manually and/or automatically to generate the mode switching signal MS, to switch the portable electronic device 100 from the normal operation mode to the sleep mode. For example, a user can input a command to switch the portable electronic device 100 to the sleep mode. For another example, when a predetermined period of time has passed and the portable electronic device 100 does not receive any command from the user, the sleep mode controller 14 can be triggered automatically to switch the portable electronic device 100 to the sleep mode. The same principle applies when the sleep mode controller 14 is omitted.

Please refer to FIGS. 2-4. In the normal operation mode, the event detection circuit 11 of the action sensor 10 senses action events by the data sensing frequency CLK1. In one embodiment, the data sensing frequency CLK1 can range between, for example but not limited to, 80~120 Hz. The actual value of data sensing frequency CLK1 can be set depending on practical needs. During this normal operation mode, the event detection circuit 11 of this embodiment is supplied with a normal current In so as to sense the action events (as shown by the step S11 in FIG. 3). The normal current In is sufficient for the event detection circuit 11 to fully function, so as to sense action events with the best accuracy and resolution. The actual value of normal current In can be set depending on practical needs.

As shown by the steps S12 and S13 in FIG. 3 and as explained in the above, manually or automatically, the portable electronic device 100 can be switched to the sleep mode. During the sleep mode, the event detection circuit 11 is supplied with the weak current Iw, and the event detection circuit 11 detects the occurrence of a wake-up event with the data sensing frequency CLK2. The data sensing frequency CLK2 is not higher than the data sensing frequency CLK1. In one embodiment, the data sensing frequency CLK2 is the same as the data sensing frequency CLK1 (i.e., the data sensing frequency CLK1 can be directly used as the data sensing frequency CLK2). In another embodiment, to reduce power consumption, the data sensing frequency CLK2 is preferably lower than the data sensing frequency CLK1, more preferably lower than or equal to 50% of but higher than a frequency of a human's action which the action sensor 10 is designed to sense. In one embodiment, the data sensing frequency CLK2 can range between, for example but not limited to, 20~60 Hz.

Besides, note that, in this embodiment of the present invention, the weak current Iw under the sleep mode is smaller than the normal current In under the normal operation mode. In one embodiment, the weak current Iw is set to be greater than zero and smaller than or equal to 50% of the normal current In. In a more preferable embodiment, the weak current Iw can be set to be for example but not limited to 20%-40% of the normal current In, such as 25%. Because the event detection circuit 11 (and hence the action sensor 10) operates by the weak current Iw, in a case that a sensitivity of the event detection circuit 11 (and hence the action sensor 10) is related to an operation current thereof, when the event detection circuit 11 operates by the weak current Iw, the sensitivity of the event detection circuit 11 is lower than the sensitivity when the event detection circuit 11 operates by the normal current In. However, this is alright because in the sleep mode, the event detection circuit 11 is not required to sense action events by a high accuracy and sensitivity; the event detection circuit 11 is only required to capture a wake-up event (the step S14). Action events may involve sophisticated behaviors such as dragging an icon on a screen or sliding toward a direction, etc. which need to be correctly interpreted; however, to switch the portable electronic device 100 from the sleep mode to the normal operation mode, it is only required to detect an occurrence of a wake-up event, i.e., whether there is or is not a wake-up event, and it is not required to read the wake-up action in detail.

Figure 1A:
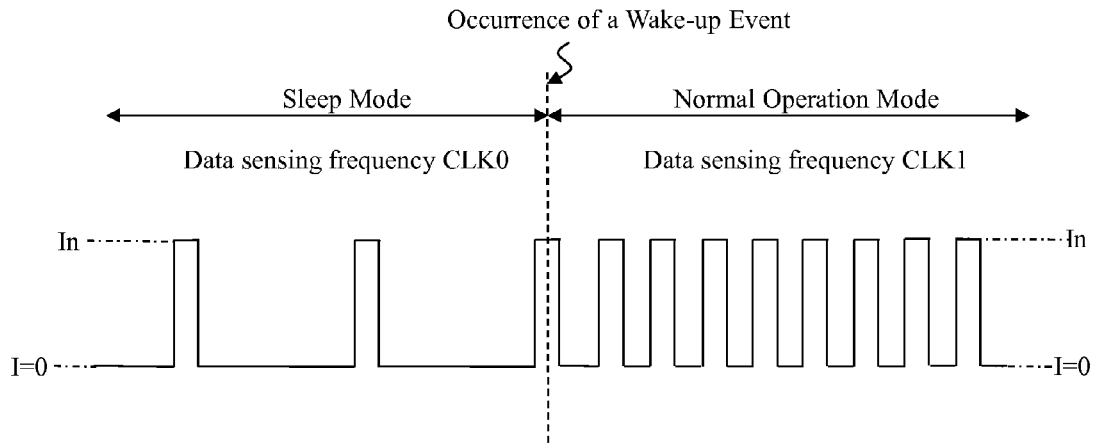
FIGS. 1A-1B show how prior art switches a portable electronic device from a sleep mode to a normal operation mode and its drawback.
Figure 1B:
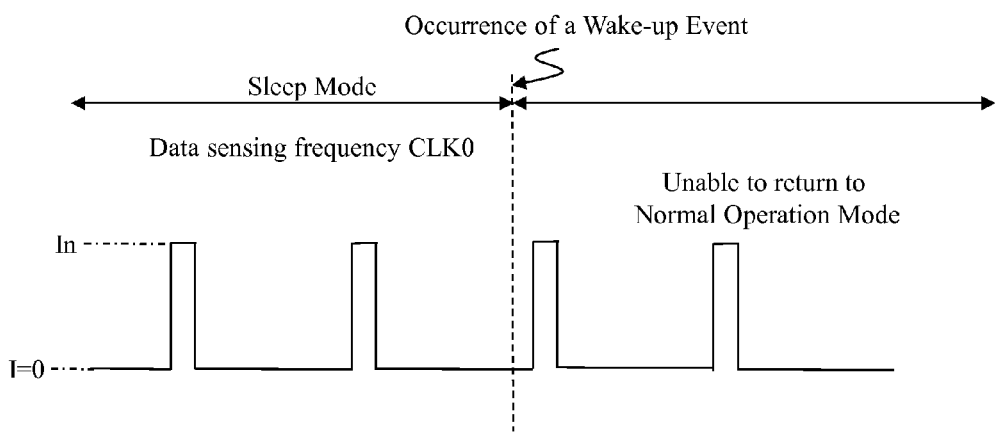

Please refer to FIG. 2 in contrast with FIG. 1B. Note that, unlike the prior art where the data sensing frequency CLK0 under the sleep mode is set to be very slow (e.g., 1 Hz), the data sensing frequency CLK2 of the present invention is greater than the data sensing frequency CLK0 of the prior art. because this data sensing frequency CLK2 is higher than a frequency of a human's action which the action sensor 10 is designed to sense, it is much less likely that the action sensor 10 misses a wake-up event; in contrast, the prior art very likely misses the wake-up event.

In addition, although the present invention senses a wake-up event by a higher data sensing frequency than the prior art, because the action sensor 10 operates by the weak current Iw in the sleep mode (in comparison, the prior art operates by the normal current In in the sleep mode), the present invention still greatly reduces power consumption in the sleep mode. More importantly, in comparison with the prior art, the present invention can correctly capture a wake-up event without miss.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. In view of the foregoing, the spirit of the present invention should cover all such and other modifications and variations, which should be interpreted to fall within the scope of the following claims and their equivalents.

What is claimed is:

1. An event detection method for waking up a portable electronic device having an action sensor, comprising the steps of:
    under a normal operation mode, sensing action events by the action sensor with a first data sensing frequency, wherein the action sensor operates by a normal current to detect the action events;
    entering into a sleep mode wherein at least one component of the portable electronic device is not fully functioning to reduce power consumption;
    under the sleep mode, detecting a wake-up event by the action sensor with a second data sensing frequency, wherein the action sensor operates by a weak current to detect the wake-up event, wherein the weak current is smaller than the normal current, and the second data sensing frequency is not higher than the first data sensing frequency;
    wherein the action sensor is a capacitive sensor sensing the action events and detecting the wake-up event according to a change of capacitance, wherein a sensitivity of the capacitive sensor is related to an operation current of the capacitive sensor, and when the capacitive sensor operates by the weak current, the sensitivity of the capacitive sensor is lower than the sensitivity when the capacitive sensor operates by the normal current; and
    returning to the normal operation mode when the wake-up event is detected.

2. The event detection method of claim 1, wherein the weak current is greater than zero and smaller than or equal to 50% of the normal current.

3. The event detection method of claim 2, wherein the weak current is 20%~40% of the normal current.

4. The event detection method of claim 1, wherein the step of entering into a sleep mode is triggered manually or automatically.

5. The event detection method of claim 1, wherein the first data sensing frequency ranges between 80~120 Hz and the second data sensing frequency ranges between 20~60 Hz.

6. An action sensor for use in a portable electronic device, comprising:
    a clock circuit for providing a first data sensing frequency under a normal operation mode and a second data sensing frequency under a sleep mode, wherein the second data sensing frequency is not higher than the first data sensing frequency, and wherein in the sleep mode, at least one component of the portable electronic device is not fully functioning to reduce power consumption;
    a current generation circuit for supplying a normal current under the normal operation mode and supplying a weak current under the sleep mode, wherein the weak current is smaller than the normal current;
    an event detection circuit coupled to the clock circuit and the current generation circuit, for sensing action events with the first data sensing frequency under the normal operation mode and detecting a wake-up event with the second data sensing frequency under the sleep mode, wherein the event detection circuit operates by the normal current to detect the action events under the normal operation mode, and wherein the event detection circuit operates by the weak current to detect the wake-up event under the sleep mode; and
    a sleep mode controller coupled to the clock circuit and the current generation circuit, for providing a mode switching signal to the clock circuit and to the current generation circuit, to switch a data sensing frequency of the clock circuit between the first and second data sensing frequencies and to switch a current provided by the current generation circuit between the normal current and the weak current;

wherein the action sensor generates an output signal for resuming the portable electronic device to the normal operation mode when the wake-up event is detected by the event detection circuit.

7. The action sensor of claim 6, wherein the weak current is greater than zero and smaller than or equal to 50% of the normal current.

8. The action sensor of claim 7, wherein the weak current is 20%~40% of the normal current.

9. The action sensor of claim 6, wherein the first data sensing frequency ranges between 80~120 Hz and the second data sensing frequency ranges between 20~60 Hz.

10. An action sensor for use in a portable electronic device, comprising:
   a clock circuit for providing a first data sensing frequency under a normal operation mode and a second data sensing frequency under a sleep mode, wherein the second data sensing frequency is not higher than the first data sensing frequency, and wherein in the sleep mode, at least one component of the portable electronic device is not fully functioning to reduce power consumption;
   a current generation circuit for supplying a normal current under the normal operation mode and supplying a weak current under the sleep mode, wherein the weak current is smaller than the normal current; and
   an event detection circuit coupled to the clock circuit and the current generation circuit, for sensing action events with the first data sensing frequency under the normal operation mode and detecting a wake-up event with the second data sensing frequency under the sleep mode, wherein the event detection circuit operates by the normal current to detect the action events under the normal operation mode, and wherein the event detection circuit operates by the weak current to detect the wake-up event under the sleep mode;
   wherein the action sensor is a capacitive sensor sensing the action events and detecting the wake-up event according to a change of capacitance;
   wherein a sensitivity of the capacitive sensor is related to an operation current of the capacitive sensor, and when the capacitive sensor operates by the weak current, the sensitivity of the capacitive sensor is lower than the sensitivity when the capacitive sensor operates by the normal current;
   wherein the action sensor generates an output signal for resuming the portable electronic device to the normal operation mode when the wake-up event is detected by the event detection circuit.

11. The action sensor of claim 10, wherein the weak current is greater than zero and smaller than or equal to 50% of the normal current.

12. The action sensor of claim 10, wherein the weak current is 20%-40% of the normal current.

13. The action sensor of claim 10, wherein the first data sensing frequency ranges between 80~120 Hz and the second data sensing frequency ranges between 20~60 Hz.

* * * * *